United States Patent
de Groot et al.

(10) Patent No.: US 8,441,822 B2
(45) Date of Patent: May 14, 2013

(54) METHOD OF CONTROLLING A MULTIPHASE POWER FACTOR CORRECTION STAGE, A POWER FACTOR CORRECTION STAGE AND A CONTROLLER THEREFOR

(75) Inventors: Humphrey de Groot, Vlijmen (NL); Hans Halberstadt, Groesbeek (NL)

(73) Assignee: NXP B.V., Eindhoven (NL)

( * ) Notice: Subject to any disclaimer, the term of this patent is extended or adjusted under 35 U.S.C. 154(b) by 410 days.

(21) Appl. No.: 12/829,219

(22) Filed: Jul. 1, 2010

(65) Prior Publication Data

US 2011/0001362 A1 Jan. 6, 2011

(30) Foreign Application Priority Data

Jul. 3, 2009 (EP) .................................. 09008736

(51) Int. Cl.
G05F 5/00 (2006.01)
G05F 1/00 (2006.01)
H02M 5/42 (2006.01)

(52) U.S. Cl.
USPC .............................. 363/89; 323/272; 323/207

(58) Field of Classification Search .................. 323/222, 323/225, 271, 272, 205, 207; 363/89
See application file for complete search history.

(56) References Cited

U.S. PATENT DOCUMENTS

| | | | | |
|---|---|---|---|---|
| 4,384,321 A * | 5/1983 | Rippel | | 363/124 |
| 5,861,734 A * | 1/1999 | Fasullo et al. | | 323/222 |
| 7,138,789 B2 * | 11/2006 | Moussaoui et al. | | 323/272 |
| 7,630,221 B2 * | 12/2009 | Sui et al. | | 363/70 |
| 7,889,525 B2 * | 2/2011 | Moussaoui | | 363/65 |
| 2008/0316783 A1 | 12/2008 | O'Loughlin | | |
| 2009/0168475 A1 * | 7/2009 | Hirosawa | | 363/84 |
| 2009/0295347 A1 * | 12/2009 | Popescu et al. | | 323/272 |

OTHER PUBLICATIONS

Chris Bridge and Laszlo Balogh, Understanding Interleaved Boundary Conduction Mode PFC Converters, 2008-2009, Fairchild Semiconductor Power Seminar, 1-14.*
T. Jiun-Ren, et al.: "Interleaving Phase Shifters for Critical-Mode Boost PFC," IEEE Transactions on Power Electronics IEEE Service Center, vol. 23, No. 3, pp. 1348-1357, (May 2008).
L. Huber, et al.: "Closed-Loop Control Methods for Interleaved DCM/CCM Boundary Boost PFC Converters," Applied Power Electronics Conference and Exposition, pp. 991-997, (Feb. 2009).
T-F Wu, et al.: "Integrated Circuits of a PFC Controller for Interleaved Critical-Mode Boost Converters," Applied Power Electronics Conference, pp. 1347-1350, (Feb. 2007).
K. Sangsun, et al.: "Control of Multiple Single Phase PFC Modules with a Single Low-Cost DSP," Annual IEEE Applied Power Electronics Conference, pp. 375-381, (Feb. 2003).
M. O'Loughin: "Phase Management Raises Interleaved PFC Efficiency," Power Electronics Technology, pp. 36-40, (Jul. 2007).
European Search Report for Patent Appln. EP09008736.2 (Nov. 24, 2009).

* cited by examiner

Primary Examiner — Bao Q Vu
Assistant Examiner — Zekre Tsehaye

(57) ABSTRACT

In order to improve the efficiency of a Power Factor Convertor (PFC) first stage to a AC-DC converter the switching cell is split into two smaller ones (each comprising a switched inductor with an output diode). Below a certain load only one cell is active. The second cell only becomes active, out of phase with the first, but not generally in antiphase, after a predefined load level is surpassed in such a way that above that level the first cell has a fixed on time and the second cell a variable one.

11 Claims, 5 Drawing Sheets

METHOD OF CONTROLLING A MULTIPHASE POWER FACTOR CORRECTION STAGE, A POWER FACTOR CORRECTION STAGE AND A CONTROLLER THEREFOR

FIELD OF INVENTION

This invention relates to methods of operating power to correction stages, power factor correction stages and controllers therefor.

BACKGROUND OF INVENTION

Power factor correction stages are often used as part of AC-DC converters. AC-DC converters are used to transform power from a supply voltage into a voltage required by an application. Typically the supply voltage is a mains voltage, and in such cases, in particular, requirements may be imposed such as the maximum allowable mains harmonics or minimum allowable power factor. In such circumstances it is common to include in the AC-DC converter a power factor correction stage. In order to minimise the power losses in the converter, it is desirable to maximise the efficiency of the power factor correction stage.

A commonly used topology for power factor correction stages is the boost converter, an example of which is shown in FIG. 1. The converter 1 comprises a coil (L1), in series with the input voltage $u_{in}$. The other end of the coil is connected to a node to between two switches SW1 and SW2. The first switch SW1 is connected to ground; the second switch (SW2) is typically implemented as a passive switch or diode as shown in FIG. 1, and is connected between node 2 and the output. An output capacitor (C1) is connected between the output and ground. For such a boost converter, the output voltage, $u_{out}$, is larger than the input voltage $u_{in}$. The coil L1, together with switch SW1 and diode SW2 may be termed a "power cell".

In operation, the output current of source $u_{in}$ can be controlled by controlling the on-time ($T_{on}$) of switch SW1. A switching cycle starts by turning on switch SW1 for a time $T_{on}$. In this phase the total input voltage $u_{in}$ is across the coil. Because the input voltage is positive the current $i_L(t)$ through coil L1 will rise:

$$i_L(t) = t\frac{u_{in}}{L_1} + i_L(0). \quad (1)$$

where $i_L(0)$ is the current at time t=0.

After a time $T_{on}$ SW1 is turned off. As the current $i_L(T_{on})$ through $L_1$ wants to flow continuously the current is automatically commutated to the diode. The output voltage $u_{out}$ is always higher than the input voltage $u_{in}$. Therefore, the current through $L_1$ will decrease:

$$i_L(t) = i_L(T_{on}) + t\frac{u_{in} - u_{out}}{L_1} \quad (2)$$

Switch SW2 is turned off after a further time $T_{off}$ when the current $i_L$ becomes zero or when SW1 is turned on again. In the case that $i_L(T_{off})$ is zero it is said that the converter works in discontinuous conduction mode (DCM), as shown by the bottom curve 21 of FIG. 2. In the case that it is allowed that $i_L$(Toff) is not always zero at the moment SW1 is turned on it is said that the converter is working in continuous conduction mode (CCM), as shown by the top curve 22 of FIG. 2. A special case is distinguished if at the time $I_L(T_{off})$ becomes zero immediately SW1 is turned on again. In this case the converter works in boundary condition mode (BCM), shown by the middle curve 23 of FIG. 2.

Typically, SW1 is implemented as a MOSFET; a diode is an effective passive switch SW2, since a diode will naturally turn on if the voltage drop is positive and naturally turn off as soon as the current through it becomes zero.

In DCM or BCM, the current through the coil L1 can show large peaks, resulting in large ripples in any input filter and the output capacitor C1. In order to reduce this ripple, it is known to use two converters of the same type operating at 180° out of phase, or even three converters with respective 120° phase shifts, etc. Such a converter may be termed an "interleaved converter".

FIG. 3 shows such a converter. The figure shows a first power cell having a coil or inductor L1 connected between input voltage $U_{in}$ and the node between switch first switch S1 and first diode D1, together with a second power cell having inductor L2 connected between the input voltage and the node between second switch S3 and second diode D2.

FIG. 4 shows the current $i_1$ through the coil L1, (top curve 41), the current $i_2$ through coil L2 (middle curve 42), and the combined current $i_1+i_2$ (bottom curve 43) for such a power factor converter, where both power cells are operating in discontinuous mode and are 180° out of phase.

Control in CCM is relatively straightforward since the frequency is fixed, but is more complicated in BCM in order to maintain the required 180° phase shift. Furthermore, in this interleaved solution both converters are always working, and thus both contribute to power losses.

Publications JIUN-REN TSAI ET AL: "Interleaving Phase Shifters for Critical-Mode Boost PFC" IEEE TRANSACTIONS ON POWER ELECTRONICS, IEEE SERVICE CENTER, PISCATAWAY, NJ, UK, vol. 23, no. 3, 1 May 2008, pages 1348-1357 and HUBER L ET AL: "Closed-Loop Control Methods for Interleaved DCM/CCM Boundary Boost PFC Converters" APPLIED POWER ELECTRONICS CONFERENCE AND EXPOSITION, 2009. APEC 2009. TWENTY-FOURTH ANNUAL IEEE, IEEE, PISCATAWAY, NJ, USA, 15 Feb. 2009, pages 991-997 disclose such interleaved solutions as does United States Patent Application, Publication US2008/0316783.

It is desirable to provide an alternative control arrangement with improved efficiency relative to a single power cell converter or to such an interleaved converter.

SUMMARY OF INVENTION

It is an object of the present invention to provide a method of operating a power factor correction stage, which provides for improved efficiency.

According to an aspect of the present invention there is provided a method of controlling a power factor correction stage comprising a first power cell having a first inductor and a first switch and a first output diode, the power factor correction stage further comprising a second power cell comprising a second inductor and a second switch and a second output diode, comprising the steps of evaluating whether a control parameter exceeds a threshold value, and operating the second power cell, such that the second power cell is not in antiphase with the first power cell, if the control parameter exceeds the threshold value. Thus the losses associated with operation of a second power cell can be avoided at low powers, whilst designs with small coils are still achievable. Thus, according to this aspect, the second power cell is operated only when the required power output exceeds that which typically is or can be supplied by the first power cell; however, since the cells are not generally operated in antiphase, simple operation can be achieved. Moreover, the respective powers provided by the two power cells will not normally be equal.

Preferably the control parameter is the sum of the peak current through the first switch and the peak current through the second switch and the threshold value is a maximum peak current through the first switch. The peak current is a convenient parameter to measure, to determine whether the threshold has been reached. Alternatively without limitation, the control parameter is a total on-time, which total on-time is equal to the sum of an on-time of the first switch and an on-time of the second switch. The total on-time conveniently is directly related to the output power.

In embodiments, depending on the control parameter when the second power cell is operational, the respective on-time of or peak current through the first switch is set to the threshold value less a value equal to a minimum on-time of or peak current through the second switch respectively. Thus, the maximum power from the first power cell can be constantly obtained, throughout periods when the second power cell is operational; by presetting the minimum respective on-time or peak current, the power at which the second power cell becomes operational can be effectively optimised, to ensure that two-power cells are used only when it is efficient to do so.

In embodiments, the second switch is turned on immediately the first switch is turned off. This is particularly convenient to implement. Alternatively but without limitation, the second switch is turned on at the end of a delay immediately following the moment the first switch is switched off, the delay being chosen to at least one of optimize an efficiency of the power factor correction stage and minimise electromagnetic interference of the power factor correction stage.

Embodiments further comprising the further steps of evaluating whether the control parameter exceeds the threshold value less an offset, and if the second power cell is operating, ceasing operation of the second power cell. Such hysteresis has the benefit of avoiding rapid cycling between the second power cell being operational, and non-operational. The hysteresis can be optimised by appropriate choice of the commencement off-set.

According to another aspect of the present invention, there is provided an integrated circuit configured to operate a method as described above; According to yet another aspect of the present invention, there is provided a controller comprising such an integrated circuit.

According to a further aspect of the invention, there is provided a power factor correction stage comprising at least one of such a controller and such an integrated circuit.

These and other aspects of the invention will be apparent from, and elucidated with reference to, the embodiments described hereinafter.

BRIEF DESCRIPTION OF DRAWINGS

Embodiments of the invention will be described, by way of example only, with reference to the drawings, in which.

Figure 1:
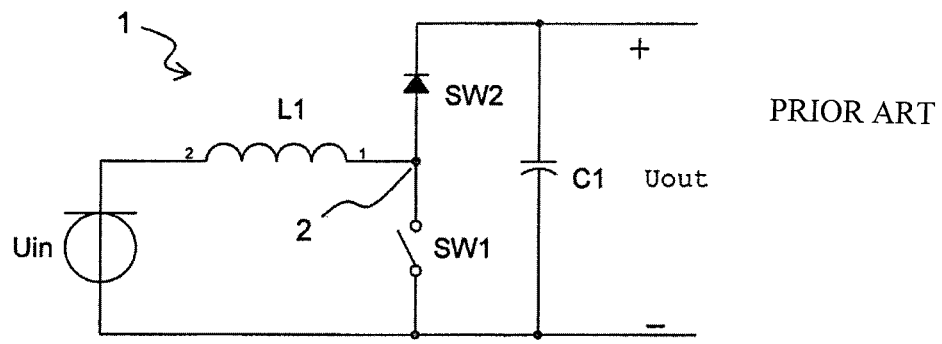
FIG. 1 shows a schematic circuit of a conventional PFC stage boost converter having a single power cell.
Figure 2:
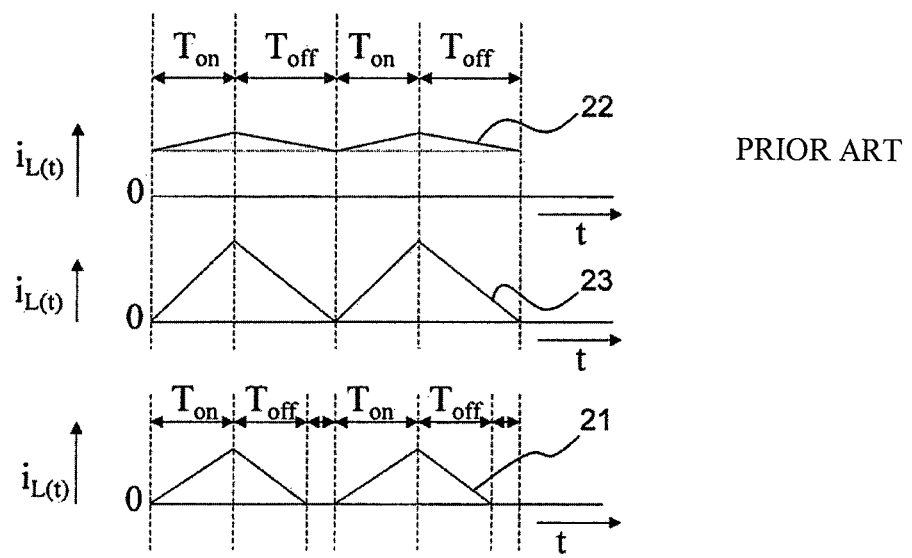
FIG. 2 shows the inductor current for a boost converter operating in CCM, BCM and DCM.
Figure 3:
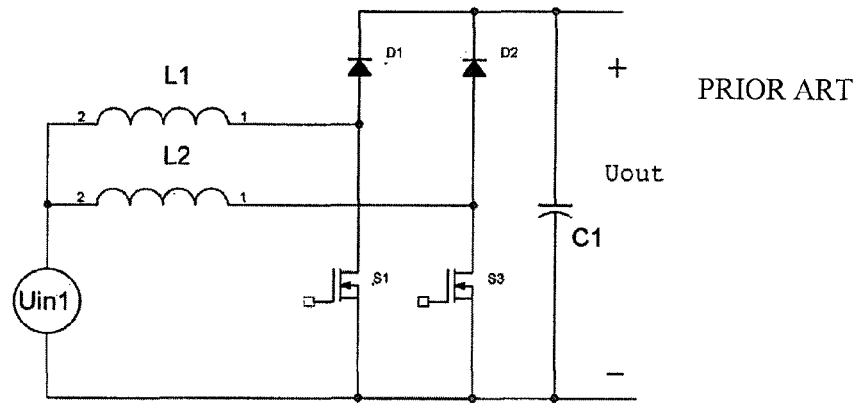
FIG. 3 shows a schematic circuit of a PFC stage boost converter having two power cells.
Figure 4:
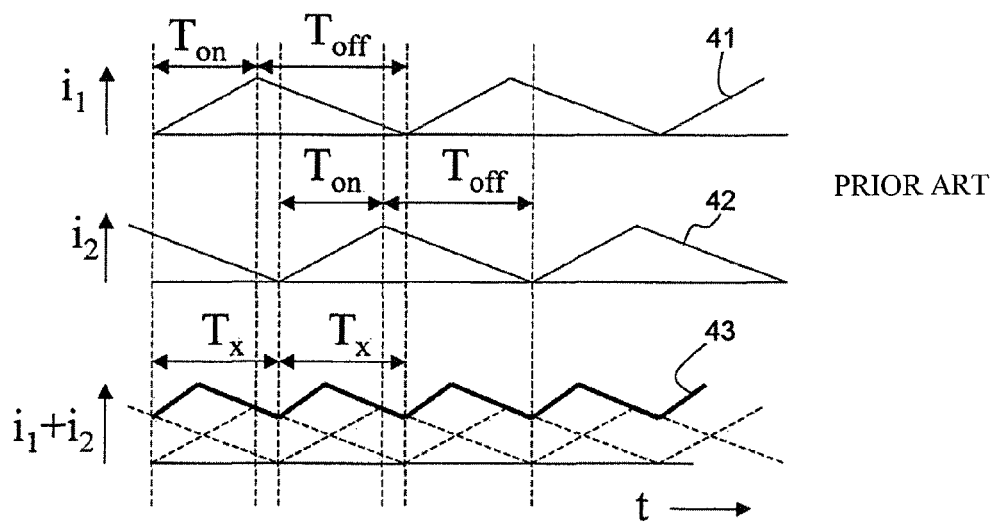
FIG. 4 shows the current of a PFC state boost converter having two power cells operating in anti-phase and each in BCM.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments

DETAILED DESCRIPTION OF EMBODIMENTS

In order to provide a good understanding of the invention, first of all the operation of a conventional single power cell boost converter, such as that shown in FIG. 1 will be considered. In general such a converter is designed for the worst-case condition, which corresponds to the lowest input voltage and the highest output power.

Considering the case of boundary conduction mode (although it should be noted that a corresponding analysis is also valid for CCM or DCM) if the input current is given by $$I_{in} = |I_{rms}\sqrt{2}\sin(\omega t)|, \quad (3)$$

and the input voltage by $$u_{in} = |u_{rms}\sqrt{2}\sin(\omega t)|. \quad (3)$$

For a given efficiency η the input power Pin is related to the output power Pout through $$P_{in}(=P_{out}/\eta) \quad (5)$$

and the rms (root mean square) current will be equal to:

$$I_{rms} = P_{in}/U_{rms} \quad (6)$$

In BCM the peak value of the current through the coil $L_1$ is in the ideal case twice the average current (=input current $I_{in}$):

$$I_{peak} = |2P_{in}\sqrt{2}\sin(\omega t)/U_{rms}| \quad (7)$$

As can be seen in this formula the peak current is dependent of the input voltage $U_{rms}$. The lower the input voltage the higher the peak current.

The size of the coil is again dependent of the maximum peak current:

$$B_{max} = u_{in}T_{on}/(A_e n_1) = L_1 i_{peak}/(A_e n_1) => A_e = i_{peak}(L_1/(B_{max}n_1)) \quad (8)$$

where Bmax=the maximum allowed magnetic flux density in the coil before saturation, $A_e$ is the effective cross-section of the coil and n1 is the number of turns in the coil.

Provided that $L_1/(B_{max}n_1)$ is (almost) constant then $A_e$ is (almost) linearly dependent of $I_{peak}$ and $A_e$ is related to the size of the coil. This means that for a higher input voltage the coil could be smaller.

It will be well known to the skilled person, and can readily be confirmed by measurement, that for a given required output power, a converter having a relatively smaller coil has lower losses and thus is more efficient than a similar with the relatively larger coil. Thus it will be immediately apparent to the skilled person that it is preferable to design a converter with a relatively smaller coil. However, a potential disadvantage arises, in that the converter may not be able to deliver the maximum required power, in the worst case. The inventor has appreciated that a solution to this problem is to use a second converter delivering the remainder of the power:

Thus, by denoting the first—main—converter (herein also called power cell) by the subscript "converter1", and the second—subsidiary—converter by the subscript "converter2":

$$P_{in,converter1} = f(I_{peak,max\ converter1}) \quad (9)$$

and $$P_{in,converter2} = P_{in,needed} - P_{in,converter1} \quad (10)$$

where $P_{in,needed}$ is the required input power, $I_{peak,max\ converter1}$ is the maximum peak-current that can be provided by the first power cell, and f(k) indicates a function of parameter k.

So, in a first embodiment of the invention, the PFC is controlled such that the power input to the first power cell is a function of the maximum peak-current which can be provided by the first power cell. Power is input to the second power cell only when the required input power exceeds that which the first power cell can handle.

The inventor has further appreciated that it is possible to take advantage of the reduced losses associated with known interleaved PFCs, alongside such a control method: by taking care of the timing of the switch of the second converter this can be arranged, as will be described below.

In case of $T_{on}$ control both ideas can be implemented:

$$i_{peak}(t) = T_{on} \cdot \left( \frac{u_{rms}\sqrt{2}\sin(\omega t)}{L_1} \right) \quad (11)$$

Given the effective voltage $u_{rms}$, the maximum peak current $i_{peak}$ is, according to the above formula (11), proportional to $T_{on}$ and according to formula (7) also proportional to the input power. Combining both gives a relation between the required power $P_{in}$ and the on-time $T_{on}$.

$$i_{peak} = 2i_{ave} = 2\frac{p_{in}}{u_{rms}}\sqrt{2}|\sin(\omega t)| \quad (12)$$

$$\Rightarrow T_{on} = \frac{i_{peak}L_1}{u_{rms}\sqrt{2}|\sin(\omega t)|} = \frac{2p_{in}L_1}{u_{rms}^2}$$

Next, the relationship can be derived between the total on-time, $T_{on,control}$, and the on-time of the first and second power cells, Ton1 and Ton2 respectively:

$$T_{on,control} = \frac{2p_{in}L_1}{u_{rms}^2} = \frac{2(p_{in,converter1} + p_{in,converter2})L_1}{u_{rms}^2} \quad (13)$$

$$= \frac{2(p_{in,converter1})L_1}{u_{rms}^2} + \frac{2(p_{in,converter2})L_1}{u_{rms}^2} = T_{on1} + T_{on2}$$

In summary, then:
firstly, controlling $T_{on,control}$ has the effect of directly controlling the power;
secondly, maximizing the on-time of the first converter, $T_{on1}$, maximizes the power of the first converter, and
thirdly, the on-time of the second converter $T_{on2}$ is readily derived as the difference between $T_{on,control}$ and $T_{on1}$:

$$T_{on2} = T_{on,control} - T_{on1} \quad (15)$$

A method of controlling a PFC, according to this embodiment of the invention, is then as follows. The output of the control produces an output signal $T_{on,control}$. The length of time that this signal is high is a measure of the required power. Depending on this length of time, two control regimes are distinguished: either (i) $T_{on,control}$ is less than the maximum time switch 1 of converter 1 is on, denoted by $T_{on,max,converter1}$. Or (ii) the time $T_{on,control}$ is longer than $T_{on,max,converter1}$. These control regimes are respectively illustrated in FIGS. 5 and 6.

Figure 5:
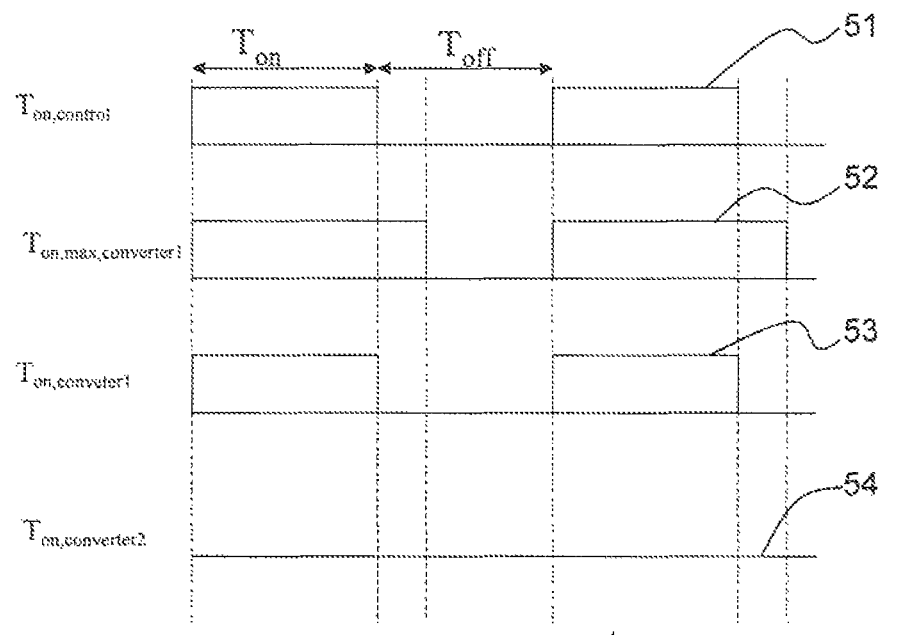
FIG. 5 shows a timing diagram of a PFC stage operated in accordance with embodiments of the invention under one power regime.

In FIG. 5, $T_{on,control} < T_{on,max,converter1}$. The figure shows four curves, which are (from the top), $T_{on,control}$ (51), $T_{on,max,converter1}$ (52), $T_{on,converter1}$ (53), and $T_{on,converter2}$ (54). In each case, a "high" signal is equivalent to "on". Since $T_{on,control} < T_{on,max,converter1}$, the first power cell (converter1) can handle all the required power, and is on for a time equal to that of $T_{on,control}$; the second power cell (converter2) is seen (from the bottom curve) to not be operational at all. Thus there is no power dissipation from the second power cell.

Figure 6:
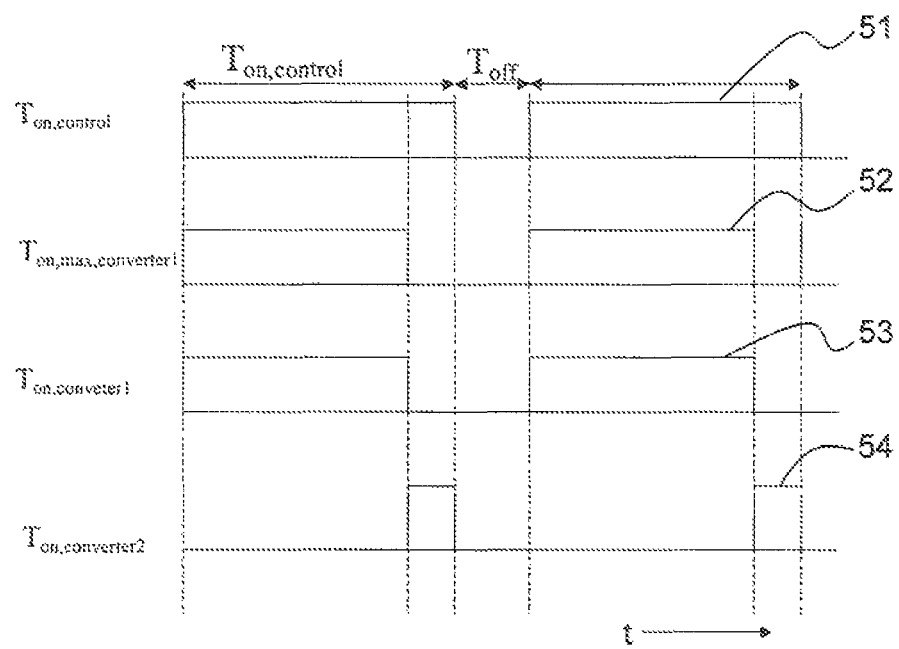
FIG. 6 shows a timing diagram of a PFC stage operated in accordance with embodiments of the invention under a different power regime to that of FIG. 5.

In FIG. 6 is shown the higher power regime. In this case, $T_{on,control} > T_{on,max,converter1}$. The equivalent four curves, that is $T_{on,control}$ (61), $T_{on,max,converter1}$ (62), $T_{on,converter1}$ (63), and $T_{on,converter2}$ (64), to those in FIG. 5 are shown; however, now the first power cell is on for the maximum allowed time: $T_{on,converter1} = T_{on,max,converter1}$. But since $T_{on,control} > T_{on,max,converter1}$, there remains some residual power which has to be supplied from the second power cell. So the second power cell is on for a period defined through equation 15 above: $T_{on2} = T_{on,control} - T_{on,converter1}$. As shown, the second power cell is turned "on" at a moment 65 immediately the first power cell is turned "off". Thus the "on" period of the complete PFC stage, $T_{on}$, is contiguous and there is a single gap $T_{off}$, prior to the cycle restarting.

Figure 7:
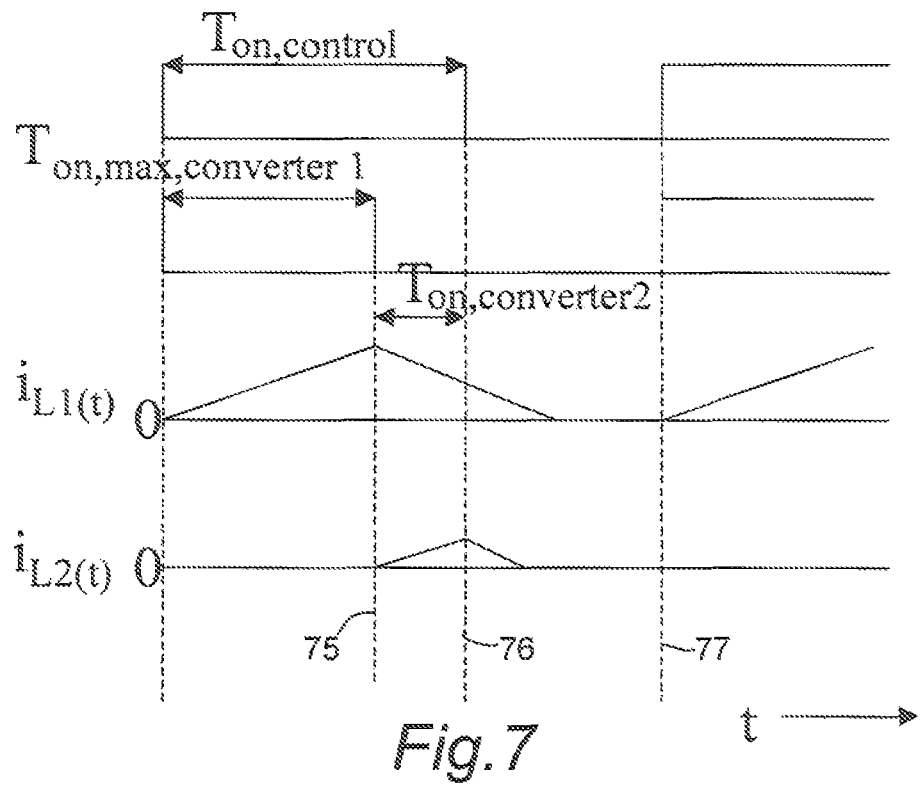
FIG. 7 shows the inductor currents for a boost converter operating under the power regime of FIG. 6.

The currents flowing in the second control regime of FIG. 6 are shown in FIG. 7. The figure shows that the current in the first coil, $i_{L1}$, ramps up during the first interval $T_{on,max,converter1}$, since the first switch 51 is closed or "on" during this time. At the end 75 of this interval, 51 is opened, and current $i_{L1}$ starts to ramp back down to zero. At the same moment, the second switch S3 of the second power cell is closed, that is, turned "on", and the current $i_{L2}$ through the second coil starts to ramp up. At the end 76 of an interval $T_{on,converter2}$, which thus corresponds to the end of the cumulative interval $T_{on,control}$, second switch S3 is turned off, and the current $i_{L2}$ through the second coil starts to ramp down. Since the PFC is operating in DCM, both currents, $i_{L1}$ and $i_{L2}$, reach zero prior to the end 77 of the cycle such that there is a period when there is no current flowing at all. It will be noted that the two currents $i_{L1}$ and $i_{L2}$ do not necessary fall to zero at the same moment.

The maximum on-time of a switch, and in particular the first switch S1, is determined by the size of the respective coil, and in particular the first coil L1:

$$i_{peak} = \frac{u_{rms}\sqrt{2}}{L_1} T_{on,max,converter1} = \frac{B_{max} A_e n_1}{L_1} \Rightarrow T_{on,max,converter1} = \frac{B_{max} n_1}{u_{rms}\sqrt{2}} \cdot A_e$$

The larger the coil the larger $T_{on,max,converter1}$ can be. Or in other words to minimize the coil size $T_{on,max,converter1}$ is chosen be as small as possible. (Of course, the smaller Ton,max, converter1, the larger the possible maximum time the second switch needs be on, and thus the larger the second coil needs to be. This places an effective lower limit on $T_{on,max,convertor1}$, being when the coils are equally sized).

In the analysis above, it is assumed that $u_{in}$ is constant, but typically the power supply is universal mains so, in another embodiment, the PFC is designed to operate between $85V_{rms}$ and $264V_{rms}$. To compensate $T_{on,max,converter1}$ for the input voltage, $T_{on,max,converter1}$ would have to be inversely dependent on $u_{rms}$.

Figure 8:
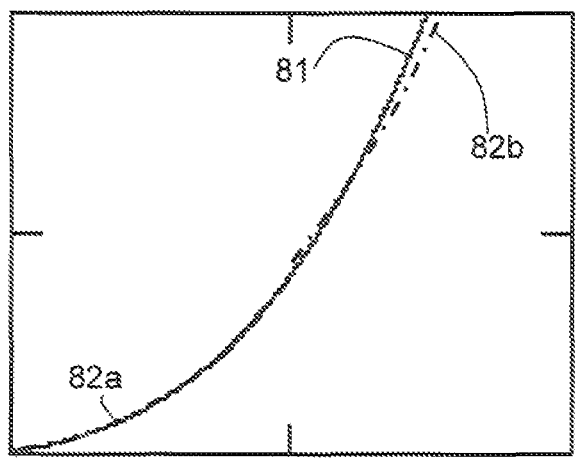
FIG. 8 shows losses for a boost converter having a single power cell and a boost converter having two power cells operated in accordance with embodiments of the invention.

In another embodiment, a different design criterion is used to select $T_{on,max,converter1}$, as will now be explained with reference to FIG. 8. FIG. 8 shows, along the y-axis, relative losses, plotted against relative input power on the x-axis. Two curves are shown. The first, continuous, curve 81 corresponds to a PFC stage where only a single power cell is operational throughout the entire range of input power. The curve monotonically increases, as does its gradient. The second curve 82 is discontinuous having lower portion 82a and upper portion 82b, and corresponds to a PFC stage operating according to an embodiment of the invention, such that only a single power cell is operational across lower range of input power, and both power cells are operational across a higher range of input power. Across the lower range of input power, as only a single power cell is operational, the curve 82a exactly coincides with the continuous curve 81. The discontinuity corresponds to the power at which the second power cell starts to be operational; for powers above discontinuity point, the curve 82b has a lower gradient than the continuous curve.

As shown, at the point of discontinuity curve 82 is higher than curve 81, that is, the losses for operation by means of two power cells are higher than for operation by means of a single cell; however, since the curve 82 has a lower slope, there is a power at which the curves cross, and at still higher powers, the two-power-cell operation according to an embodiment of the invention demonstrates lower losses. Thus the arrangement for which the curves are shown is not optimised, since there is a region of power for which the two-power-cell configuration has higher losses. By suitably adjusting a threshold corresponding to the power at which the second power-cell starts to contribute, that is, by suitably choosing $T_{on,max,converter1}$, it can be arranged that the two-power-cell configuration never has higher losses. The optimum position for $T_{on,max,converter1}$ is the position at which the curves cross (in which case there would be no discontinuity in curve 82 itself, but only in its gradient).

Applying this design criterion results in a $T_{on,max,converter1}$ which is smaller than that derived by using the criterion relating to $A_e$ (the effective area of the coil) described above. Thus compensation to accommodate variation in $u_{rms}$ is not, in practice, required.

The skilled person will appreciate that since the power cells are not operating exactly in anti-phase, the improvements to the ripple current will not be as good as that achieved by an interleaved PFC, but in the case of the full load, where $T_{on,converter2}$ approaches $T_{on,max,converter1}$, the improvement will approach that of an interleaved PFC.

It will be immediately apparent that the inductor coils do not have to have the same inductance or even the same size but may differ in both these respects. Furthermore, it will be immediately apparent that although the above analysis has been made with respect to a PFC stage operating in DCM, the invention is not limited thereto but extends to PFC stages operating in either BCM or CCM.

Figure 9:
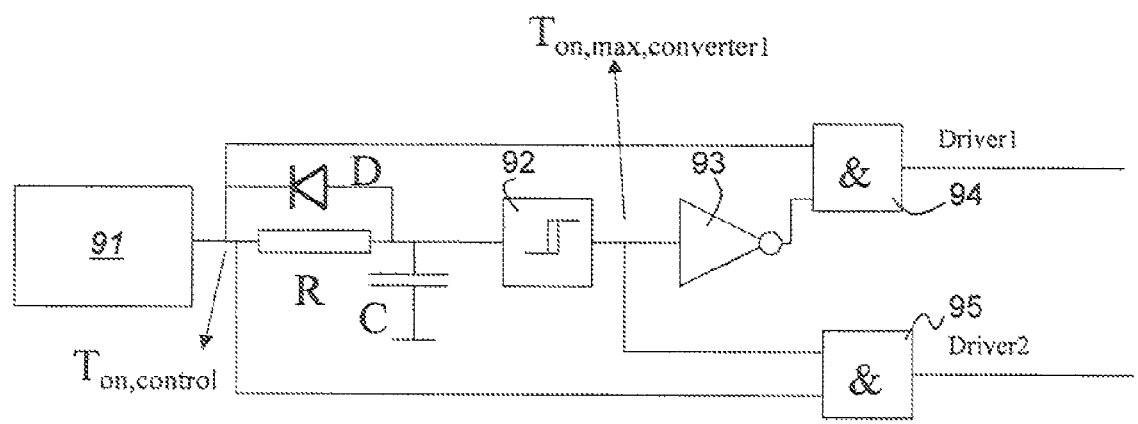
FIG. 9 shows a schematic diagram of a controller for a PFC stage, configured according to embodiments of the invention.

FIG. 9 shows a controller for a PFC stage, configured in accordance with an embodiment of the invention. FIG. 9 comprises a standard PFC controller 91, which outputs, at node 96, a control signal $T_{on,control}$. The output $T_{on,control}$ from the standard PFC controller is connected to driver1 and driver2 for respective power cells 1 and 2, by means of respective AND circuits 94 and 95.

The standard PFC controller 91 output at node 96 is further connected to an RC timing circuit, with a diode connected across the resistance part of the RC combination. The timing circuit is connected to the input of Schmitt trigger 92. Output of Schmitt trigger 92 is connected directly to the AND circuit 95 for the driver2 for power cell 2, and indirectly, by means of logical NOT circuit 93, to the AND circuit 94, and thence to the driver 1 of power cell 1.

In operation, whenever the output of the standard PFC controller 91 is high: that is, throughout the interval $T_{on,control}$, one input to each of AND circuits 94 and 95 is high. Additionally, the other input to one, and only one due to the inclusion of the inverting NOT circuit 93, of the AND circuits 94 and 95 will be high, depending on the output status of Schmitt trigger 92. Initially, the Schmitt trigger is the low and the second input to a hand circuit 94 for driver one is high. However, if the output of the standard PFC control 91 remains high for sufficiently long that sufficient charge builds up across capacitor C to raise its voltage such that the Schmitt trigger 92 is set, then the situation is reversed, and the second input to AND circuit 95 goes high whereas the second input to AND circuit 94 goes low, thereby switching off driver 1 and switching on driver2.

In summary, from one viewpoint it has been disclosed that, in order to improve the efficiency of a Power Factor Convertor (PFC) first stage to a AC-DC converter the switching cell is split into two smaller ones (each comprising a switched inductor with an output diode). Below a certain load only one cell is active. The second cell only becomes active, out of phase with the first but not generally in antiphase, after a predefined load level is surpassed in such a way that above that level the first cell has a fixed on time and the second cell a variable one.

Features which are described in the context of separate embodiments may also be provided in combination in a single embodiment. Conversely, various features which are, for brevity, described in the context of a single embodiment, may also be provided separately or in any suitable sub-combination.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A method of controlling a power factor correction stage comprising a first power cell having a first inductor and a first switch and a first output diode, the power factor correction stage further comprising a second power cell comprising a second inductor and a second switch and a second output diode, the method comprising:

evaluating whether a control parameter exceeds a threshold value, the control parameter directly related to output power and including one of a sum of a peak current through the first switch and a peak current through the second switch, and a total on-time equal to a sum of an on-time of the first switch and an on-time of the second switch;

operating the second power cell, such that the second power cell becomes active and is not in antiphase with the first power cell, if the control parameter exceeds the threshold value; and operating, when the second power cell is operating, the first power cell such that one of:

the peak current through the first switch is set to the threshold value less a value equal to a minimum peak-current through the second switch, wherein the threshold value is a maximum peak current through the first switch, and the on-time of the first switch is set to the threshold value less a value equal to a minimum on-time of the second switch.

2. A method according to claim 1, wherein the control parameter is a sum of a peak current through the first switch and a peak current through the second switch and the threshold value is a maximum peak current through the first switch.

3. A method according to claim 2, further comprising, when the second power cell is operating, operating the first power cell such that the peak current through the first switch is set to the threshold value less a value equal to a minimum peak-current through the second switch.

4. A method according to claim 1, wherein the control parameter is a total on-time, which total on-time is equal to a sum of an on-time of the first switch and an on-time of the second switch.

5. A method according to claim 4, wherein, when the second power cell is operational, the on-time of the first switch is set to the threshold value less a value equal to a minimum on-time of the second switch.

6. A method according to claim 1 wherein the second switch is turned on immediately the first switch is turned off.

7. A method according to claim 1, wherein the second switch is turned on at a end of a delay immediately following the moment the first switch is switched off, the delay being chosen to at least one of optimize an efficiency of the power factor correction stage and minimise electromagnetic interference of the power factor correction stage.

8. A method as claimed in claim 1, further comprising evaluating whether the control parameter exceeds the threshold value less an offset, and if the second power cell is operating, ceasing operation of the second power cell.

9. An integrated circuit configured to operate a method as claimed in claim 1.

10. A controller for a power factor correction stage, the controller configured and arranged to output a control signal and comprising an integrated circuit as claimed in claim 9, the integrated circuit configured and arranged to receive the control signal and to operate the power cells in response to the control signal.

11. A power factor correction stage comprising a controller as claimed in claim 10 and configured and arranged to operate as a first stage of an alternating current (AC) to direct current (DC) converter.

* * * * *